Patented Aug. 8, 1950

2,518,264

UNITED STATES PATENT OFFICE 2,518,264

METHOD OF PREPARING IMIDAZOLIDONES

Benjamin Abramovitch, Stamford, Conn., assignor to American Cyanamid Company, New York, N. Y., a corporation of Maine No Drawing. Application January 23, 1946, Serial No. 642,989

7 Claims. (Cl. 260—309.6)

The present invention relates to a method for the production of imidazolidones and more specifically 1-substituted imidazolidones-2 of the following general formula:

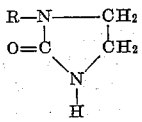

where R is an aliphatic, cycloaliphatic, araliphatic, aryl or alpharyl radical.

The invention contemplates that such imidazolidones may be prepared by heating 2-imino-3-substituted oxazolidines of the following general formula:

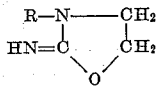

where R has the meaning given above.

The invention further contemplates that the rearrangement and production of the imidazolidones may be accomplished by heating the 2-imino-3-substituted oxazolidine to a temperature above substantially 135° C., the preferred temperature range being substantially 150°–215° C.

Further, the invention contemplates that the rearrangement reaction may be carried out by heating the oxazolidine in the aforementioned temperature range alone or in an inert diluent or solvent. Such inert diluents and solvents are preferably high boiling but low boiling materials may likewise be used although their use requires an autoclave or other closed system. These diluents and solvents may be ethers, esters, aromatic and aliphatic hydrocarbons, chlorinated hydrocarbons and the like. Alcohols may be used but such hydroxylic materials are not preferred. Likewise, the presence of water should be avoided.

It is preferable that the reaction be carried out in the absence of atmospheric oxygen and such inert atmosphere may be provided by the use of an inert gas such as nitrogen or by the use of vacuum. When a solvent or diluent is employed, the vapors of the same can be used to exclude the atmospheric oxygen. This minimizes the formation of undesirable oxidation products which color the final product and impose a step of purification.

The 2-imino-3-substituted-oxazolidines which are used as the starting material in the present invention may be prepared by the reaction of a cyanogen halide with an N-substituted ethanolamine at a temperature range of substantially 0°–50° C. This reaction is run preferably in a solvent and/or diluent which will not enter into reaction with the reagents or product. Such solvents and/or diluents may be ethers, alcohols, ketones, saturated or unsaturated hydrocarbons, and the like. The preparation of 2-imino-3-aryl oxazolidines proceeds smoothly under the above conditions to produce a hydrohalide salt of the oxazolidines which may be set free by treatment of the salt with alkali. However, the preparation of 2-imino-3-aliphatic oxazolidines does not proceed as well as the preparation of the corresponding aromatic oxazolidines. In this latter reaction, it is necessary to include a strong hydrogen halide acceptor with the reagents in order to overcome the competition between the substituted N-aliphatic ethanolamine and the resultant substituted 2-imino-3-aliphatic oxazolidine for the hydrogen halide liberated in the reaction. As soon as any hydrogen halide is liberated in the reaction, not only the hydrohalide of the substituted oxazolidine but also that of the substituted ethanolamine is formed. As the amount of substituted ethanolamine hydrohalide increases, its reaction rate with the cyanogen halide approaches zero, and further production of 2-imino-3-aliphatic oxazolidines is not realized. This results in very low yields of the 2-imino-3-aliphatic oxazolidines. This poor yield is in marked contrast to the high yields of the reaction product which are obtained when N-aryl ethanolamines are used. The basicity of aromatic amines is much lower than that of aliphatic amines. In the reaction of a cyanogen halide with a substituted N-aryl ethanolamine, the resulting substituted 2-imino-3-aryl oxazolidine accepts the hydrogen halide almost completely so that high yields of the aromatic oxazolidine derivatives are obtained.

Examples are included herein as typical of the methods used in the preparation of both substituted 2-imino-3-aryl oxazolidines and substituted 2-imino-3-aliphatic oxazolidines.

EXAMPLE 1

*2-imino-3-phenyloxazolidine*

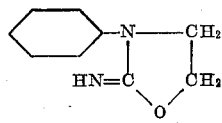

| Reagents: | Molar ratio |
|---|---|
| Phenylethanolamine | 1.0 |
| Benzene | 1.0 |
| Cyanogen chloride | 1.0 |

The phenylethanolamine is dissolved in the benzene, and the resulting solution is cooled to 10° C. Cyanogen chloride is passed in slowly as the reaction is strongly exothermic. The temperature is kept below substantially 5° C., both by adjusting the addition rate of the cyanogen chloride and also by the application of external cooling. The reaction is best carried out in a flask provided with a reflux condenser through which is circulated water sufficiently cold to condense any cyanogen chloride vapors so that this reactant is returned to the reaction vessel. When the addition of the cyanogen chloride has been completed, the external cooling is terminated and the reaction mixture agitated until exothermic tendencies are no longer evidenced. It may be necessary to apply occasional cooling for a short time after the addition of the cyanogen chloride is completed, but this is not always required. When the reaction is terminated, as shown by a drop in temperature, the crystalline solid, 2-amino-3-phenyloxazolidine hydrochloride is filtered, washed with benzene, and dried. If care is not taken to maintain anhydrous conditions a hydrated salt melting at 68.5°–69.5° C. is obtained. However, this salt is easily dehydrated under vacuum to provide a salt melting at 126°–126.5° C. The free 2-amino-3-phenyloxazolidine may be prepared by adding a slight excess of NaOH over the theoretical amount to an aqueous solution of the hydrochloride salt. The free base precipitates and after filtering, washing with water, and drying, it melts at 99°–100° C. The free base is recovered quantitatively from the hydrochloride salt.

EXAMPLE 2

*2-imino-3-dodecyloxazolidine*

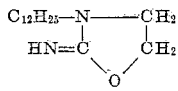

| Reagents: | Molar ratio |
| --- | --- |
| Dodecylethanolamine | 1.0 |
| Cyanogen chloride | 1.0 |
| Sodium hydroxide | 1.1 |
| Benzene | 13.5 |

The dodecylethanolamine, the sodium hydroxide, preferably in powdered form, and the benzene are mixed and thoroughly agitated. The cyanogen chloride is added to this agitated mixture at a rate of substantially 2 mols per hour. During reaction the temperature is maintained at 5°–15° C. After the cyanogen chloride addition is completed, the reaction mixture is stirred at room temperature for about an hour. The sodium chloride which forms during the reaction is removed, and the clear yellow benzene solution may be concentrated to yield the waxy free base, crude 2-imino-3-dodecyloxazolidine. However, since this material is more easily recovered as the hydrochloride, the aforementioned yellow benzene solution is best treated with approximately a stoichiometric amount of gaseous HCl at a temperature range of 5°–30° C. After removing the benzene under vacuum, the crude waxy hydrochloride salt is digested with boiling acetone, the solid is filtered, and washed with cold acetone. Additional impurities can be removed by a second digestion in hot acetone. The crystalline 2-imino-3-dodecyloxazolidine hydrochloride obtained therefrom melts at 161°–162° C.

EXAMPLE 3

*2-imino-3-cyclohexyloxazolidine*

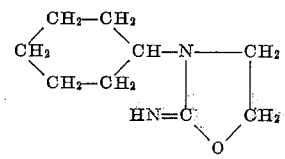

| Reagents: | Molar ratio |
| --- | --- |
| Cyclohexylethanolamine | 1.0 |
| Cyanogen chloride | 1.0 |
| Sodium hydroxide | 1.0 |
| Benzene | 6.5 |

The benzene slurry of cyclohexylethanolamine and sodium hydroxide, preferably in powdered form, is agitated and cooled to 0°–5° C. and the cyanogen chloride is added at the rate of one mol per 45–65 minutes. During reaction the temperature is allowed to rise slowly to about 15° C., and after the addition of the cyanogen chloride is completed, the reaction mixture is stirred for about 3 hours at approximately 30° C. The sodium chloride formed during the reaction is removed and washed with benzene. The benzene washings and the filtrate are combined and the benzene removed under reduced pressure. The residue is crude 2-imino-3-cyclohexyloxazolidine which is distilled at 115°–116° C./3 mm. The hydrochloride salt may be prepared by treating the free base with approximately a stoichiometric amount of HCl. After this colorless solid is recovered and dried it melts at 197°–198° C.

It may be desirable to recover the 2-imino-3-cyclohexyloxazolidine as the hydrochloride without resorting to the above mentioned vacuum distillation. In this case the benzene filtrate, containing the free base, is treated with gaseous HCl, precipitating colorless 2-imino-3-cyclohexyloxazolidine hydrochloride which melts, after recrystallization from ethanol, at 197°–198° C.

Typical examples of substituted imidazolidones which may be prepared by the method of the present invention are shown in the following examples.

EXAMPLE 4

*1-phenylimidazolidone-2*

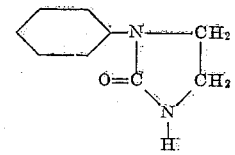

2-imino-3-phenyloxazolidine is heated in an inert atmosphere of nitrogen for about an hour at a temperature of substantially 190° C. After the clear melt is cooled, an almost colorless glassy solid is obtained which is dissolved in hot ethanol. On cooling, crystalline needles of 1-phenylimidazolidone-2 separate and, after filtering and drying, the product melts at 160°–162° C.

Another portion of 2-imino-3-phenyloxazolidine is heated at substantially 150° C. for approximately two hours. The resultant glassy solid is purified by crystallization from alcohol as indicated above and also melts at 160°–162° C.

EXAMPLE 5

*1-dodecylimidazolidone-2*

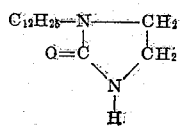

A sample of 2-imino-3-dodecyloxazolidine is heated at substantially 215° C. for one to two hours under a vacuum of approximately 5 mm. After cooling, the viscous product solidifies and is purified by crystallization from hexane to yield colorless, crystalline plates of 1-dodecylimidazolidone-2, melting at 69° C.

EXAMPLE 6

*1-cyclohexylimidazolidone-2*

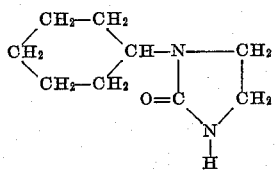

A portion of 2-imino-3-cyclohexyloxadolidine is heated at substantially 165° C. for about 10 minutes. The melt is then cooled, digested, and recrystallized from ether to yield crystalline 1-cyclohexylimidazolidone-2 which melts at 166°–168° C.

1-cyclohexylimidazolidone-2 is also prepared by heating 2-imino-3-cyclohexyloxazolidine dissolved in diethyl benzene at substantially 175° C. for about 30–60 minutes. After the reaction mixture is cooled, 1-cyclohexylimidazolidone-2 separates and after purification, melts at 166°–168° C.

The substituted imidazolidones which may be prepared according to the method of the present invention are useful as intermediates in the production of pharmaceuticals, chemotherapeutic agents, insecticides, textile agents, plastics, resins, and the like.

While the invention has been described with particular reference to specific embodiments, it is to be understood that it is not to be limited thereto but is to be construed broadly and restricted solely by the scope of the appended claims.

I claim:

1. A method of preparing 1-substituted imidazolidones-2 where said 1-substituent is a radical selected from the group consisting of aliphatic, cycloaliphic, araliphatic, aryl and alpharyl, which comprises heating a 2-imino-3-substituted oxazolidine, where said 3-substituent is selected from the aforesaid group, under anhydrous conditions to a temperature above substantially 135° C., and recovering the resultant imidazolidone.

2. The process of claim 1 in which the reaction is carried out at a temperature range of substantially 150°–215° C. in an atmosphere of nitrogen.

3. The process of claim 1 in which the reaction is carried out at a temperature range of substantially 150°–215° C. under vacuum.

4. The process of claim 1 in which the reaction is carried out at a temperature range of substantially 150°–215° C. in a liquid hydrocarbon.

5. A method of preparing 1-phenylimidazolidone-2 which comprises heating 2-imino-3-phenyloxazolidine in the presence of nitrogen in the temperature range of substantially 150°–215° C., for about one hour, and recovering the 1-phenylimidazolidone-2.

6. A method of preparing 1-dodecylimidazolidone-2 which comprises heating 2-imino-3-dodecyloxazolidine under vacuum in the temperature range of substantially 150°–215° C., for from one to two hours and recovering the 1-dodecylimidazolidone-2.

7. A method of preparing 1-cyclohexylimidazolidone-2 which comprises heating in the presence of a liquid hydrocarbon 2-imino-3-cyclohexyloxazolidine in the temperature range of substantially 150°–215° C., for about 10 minutes and recovering the 1-cyclohexylimidazolidone-2.

BENJAMIN ABRAMOVITCH.

REFERENCES CITED

The following references are of record in the file of this patent:

UNITED STATES PATENTS

| Number | Name | Date |
|---|---|---|
| 2,027,031 | Engelmann | Jan. 7, 1936 |

OTHER REFERENCES

Prelog et al.: Chemical Abstracts, vol. 26, page 2168.